Dec. 26, 1961   J. D. SKELTON ETAL   3,014,650
ANALYSIS OF SEISMIC RECORDS

Filed June 19, 1957   3 Sheets-Sheet 1

Haines Champlin Hibbard
Jesse Daniel Skelton    Inventors

By James A. Reilly   Attorney

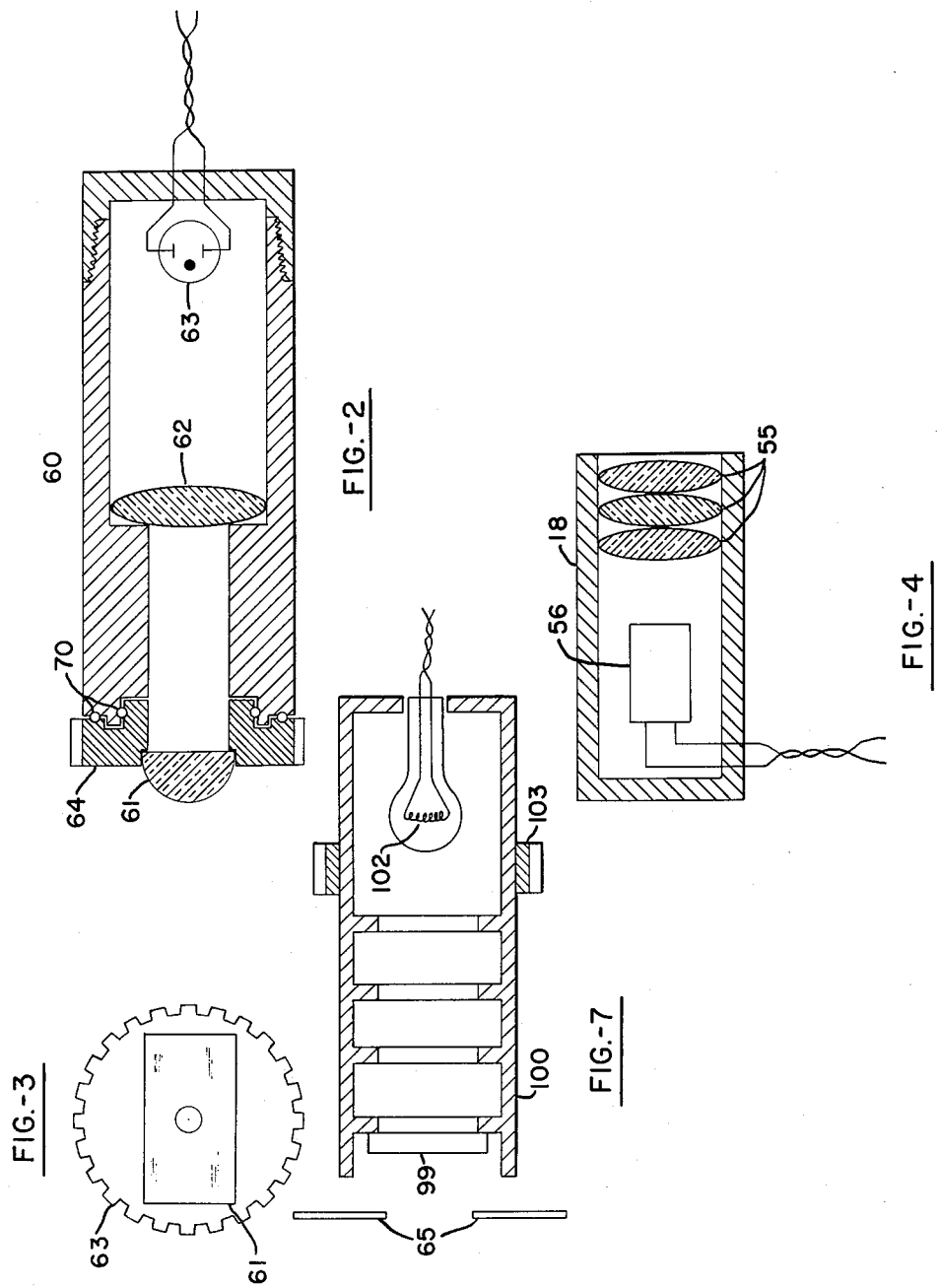

Dec. 26, 1961     J. D. SKELTON ETAL     3,014,650

ANALYSIS OF SEISMIC RECORDS

Filed June 19, 1957     3 Sheets-Sheet 3

Haines Champlin Hibbard
Jesse Daniel Skelton     Inventors

By     Attorney

United States Patent Office 3,014,650
Patented Dec. 26, 1961

3,014,650
ANALYSIS OF SEISMIC RECORDS
Jesse D. Skelton and Haines C. Hibbard, Tulsa, Okla., assignors, by mesne assignments, to Jersey Production Research Company
Filed June 19, 1957, Ser. No. 666,549
10 Claims. (Cl. 235—61.6)

This invention is broadly concerned with the analysis and correlation of seismic records. More particularly, the invention pertains to a system for scanning and reproducing the information on a reproducible seismic record in a manner to establish and illustrate the most probable correlation of the information in the record. The invention is especially directed toward an apparatus for systematically reproducing a reproducible-type seismic record; processing the reproduced information to emphasize obscured information of interest; and thereafter re-cording and incorporating the information of interest in a form more suitable for seismic interpretation. In a preferred version of the invention, means are provided for systematically processing the information recorded within a seismic record in a manner to emphasize the most probable orientation of reflections within the record, thereafter producing a variable density-type seismic record in which the emphasized information is recorded so as to exhibit its most probable orientation and also so as to minimize noise and other spurious information.

Geophysical prospecting procedures using artificially induced seismic disturbances have found wide application in the search for petroleum and other mineral deposits. In all of these methods, it is the general practice to initiate an explosion or other seismic disturbance at a point near the surface of the earth and to direct seismic waves downward into the earth from that point. The waves continue their downward travel, until they encounter discontinuities in the earth's structure—e.g., various substrata, faults, and the like.

The discontinuities have the effect of reflecting at least a portion of the energy in the seismic waves back toward the surface of the earth. Hence, by arranging a plurality of seismic detectors in an array at spaced distances from the disturbance point, it becomes possible to detect the arrivals of the reflected waves at the surface of the earth. Furthermore, by using a seismograph including suitable timing and recording means, it also becomes possible to determine not only the magnitude of the reflected signals received by the various detectors but also the time intervals required for seismic energy to travel from the disturbance point down to the various reflecting discontinuities and thence to the detectors. By ascertaining this information, and by measuring the distances between the various detectors and the disturbance point—and by further measuring or assuming velocities of seismic waves in the particular section of the earth under study—it is possible to determine the nature and depths of the various reflecting discontinuities beneath the surface of the earth.

Generally speaking, the signals that are generated by a spread or an array of seismic detectors in a seismic observation are recorded by a seismograph in the form of separate side-by-side channels or traces of information on a suitable recording medium. Movement of the recording medium relative to its recording device is closely controlled throughout the observation, and each channel or trace of information on the medium is therefore a reasonably accurate record with time of the outputs of the various detectors.

Each channel or trace of information on a seismogram derived from a seismic observation is, in effect, a record of the "seismic signal" which has been generated at a particular seismic detector station in the observation. In other words, a "seismic signal" may be considered to be an electrical transient generated by a seismic detector during the interval of a seismic observation. It is also conveniently considered to be the signal recorded from a detector as a trace or channel of information on a seismogram.

Inasmuch as the individual geophone or detector stations in a seismic observation are generally at different distances from the shot point, and since the stations are generally also at different levels relative to a predetermined datum, it will be recognized that corresponding reflections on the different traces in a seismogram will usually occur at different points along the seismogram. Persons interpreting the information on a seismogram therefore find it necessary to apply corrections to the individual traces before accurate interpretation of the traces may be made. The corrections include so-called "static" or "fixed" corrections, as well as "dynamic" or "variable" corrections. Static corrections include elevation and weathering corrections, and each point along any given seismic trace receives the same amount of this type of correction. Dynamic corrections, on the other hand, include "spread" corrections; and each point along any given seismic trace generally receives a different amount of this type of correction.

Various methods and apparatus have been proposed and used for recording seismic trace information. A particularly effective and attractive system consists in recording each seismic signal as a reproducible trace or channel of information. Reproducible traces, for example, include magnetic traces, variable density photographic traces, variable area photographic traces, variable color photographic traces, and the like. All of these traces are characterized by the property that the signals recorded on the traces may be readily reproduced from the traces by simply scanning the traces with suitable reproduction devices. Furthermore, various forms of equipment have been recently developed for reproducing the signals recorded on such traces, applying static and dynamic corrections to the traces, and thereafter re-recording and incorporating the trace information within a corrected seismic section.

The trace information within a corrected seismic section—in addition to being corrected for static and variable seismic errors—is also preferably adjusted in width so as to correspond to the detector stations corresponding to the traces. The final assembly of traces, therefore, generally constitutes a very striking representation of the structure of a cross section of the earth. In good seismic recording areas, these sections very clearly exhibit the orientation and locations of the reflecting structures within a portion of the earth.

At this point, it should be noted that seismograms need not be converted into seismic sections before analysis of the information within the seismograms may be attempted. However, it has been found that interpretation of the information may be greatly facilitated by performing this operation. Furthermore, while it is possible to make various types of seismic sections, it is generally preferred to make sections of a visual record type—and especially sections of a variable density type. Variable density sections have shown themselves to be of great value and assistance in ascertaining the nature of structures within a portion of the earth by studying seismic records obtained in that region.

While modern seismic prospecting techniques, seismograms, sections, and the like have all shown themselves to be very helpful in structural studies of the earth, nevertheless, there are still occasions where seismic information is so complex as to render interpretation of seismic records well-nigh impossible. The information on the records—whether the records be seismograms or corrected sections—is so confusing that it is extremely difficult to determine or follow "reflection crossings" on the records. Indeed, in some instances, any one of a large number of seemingly contradictory correlations may be made. Furthermore, unfortunately, these "poor" records are frequently obtained in areas of complex geology where the possibilities of oil traps and the like are especially favorable. It is, in short, a pressing problem to find more suitable and satisfactory systems for gleaning information of interest from such records. It is of particular interest to develop systems of seismic record analysis in which the orientation and nature of obscured reflecting subsurfaces may be ascertained. It is of particular interest to develop a system of record analysis which depicts more clearly the inclination (angles of dip) and continuity of reflecting structures.

It is, therefore, an object of the present invention to provide an improved system for analyzing seismic records. It is a further object of the invention to provide a system of seismic record analysis in which the task of determining "reflection crossings" within seismic records is expedited and facilitated. It is a more particular object of the invention to provide means for processing systematically a reproducible seismic record in a manner to exhibit visually the most probable orientation and location of subterranean structures within the portion of the earth corresponding to the records. It is a further object of the invention to make it possible to analyze and interpret seismic records—both seismograms and sections—which hitherto have been extremely difficult or impossible to interpret.

These and related objects, which will be readily apparent or expressly considered in the following description, may be attained by means of a correlation system in which reproducible multi-trace seismic records are reproduced over short intervals of the records; the reproduced information is processed so as to emphasize reflection events having consistent shapes and lying in approximately straight lines across the records; and thereafter reprinting—in effect—the original record with the processed information predominating. The new record, in a sense, therefore, is a correlated record dimensionally proportional or otherwise consistent with the original record but exhibiting an improved correlation of the information of most probable interest on the record.

In practicing the present invention, it is essential that the original records that are used be of a reproducible type and that a "zero" seismic signal be represented on the records by a neutral value. Thus, variable density sections—which are preferred forms of reproducible records for the purposes of this invention—should be of a type such that a zero seismic signal is recorded as a neutral gray shade. Then, signals other than zero are recorded as shades lighter or darker than the gray shade, depending upon their algebraic sign.

In a general concept, the invention comprises a scanning and reproducing component, a computing component, and a printing component. All three components operate in combination with one another and cooperate to produce the results desired.

Referring first to the scanning and reproducing component, this unit scans and reproduces a multi-trace reproducible seismic record in an interval-by-interval fashion along the record so as to generate a plurality of electical signals or transients—each interval accounting for a separate such signal or transient. Expressed otherwise, this component of the invention repeatedly scans along a predetermined plurality of traces on a reproducible record; and, during each scan, it reproduces an interval of the plurality of traces to generate a series of electrical transients. The interval of interest is stepped along the length of the record for each successive scan, until the entire length of the record has been so processed.

In scanning along the length of a plurality of traces, the intervals of reproduction for successive scans overlap one another so that each point along the traces is subjected to the reproduction process a number of times. Furthermore, the entire length of each plurality of traces is subjected to a series of repeated scans—each series being adapted to reproduce preferentially information lying at a predetermined angle within the traces. It is well known that structures within the earth frequently lie or slope at angles with respect to the horizontal, and the inclination or slope of a structure is popularly known as its angle of dip. The scanning and reproduction phase of this invention is therefore carried out at different angles to simulate different angles of dip.

At any given instant in a reproduction interval, the region or portion of a seismic record being reproduced by the invention is a very narrow band extending laterally across the record. For example, the length of the band (i.e., the dimension of the band extending along the length of the record) should generally be of the order of 250 milliseconds or less along the record.

Each interval along a set of traces may be varied in its duration in accordance with the quality of the traces. For example, with records of relatively good quality, the length of the scanning interval may be kept relatively short; whereas, with records of relatively poor quality, the interval should be relatively long. The optimum interval length for any given record may be readily ascertained by the operator with a modicum of experimentation and experience. Generally speaking, interval lengths of about 25 to 250 milliseconds of time (along a seismic record) have been found to be effective for wide ranges of record quality; and interval lengths of about 100 to 150 milliseconds have been found to be quite satisfactory for the great majority of the usual records. It will be recognized, of course, that the scanning interval should not be excessively short (i.e., of the order of 25 milliseconds or less); otherwise, the invention will do little more than simply reproduce the very information being analyzed.

Insofar as the number of interval overlaps is concerned, it has been found that a gate move increment of about four milliseconds per scan is satisfactory. This degree of gate movement, for instance, will consider a given piece of data 25 times in a 100-millisecond gate period before it passes out of the gate. This overlap is dependent on the time scale length of the reproducible record being used; but, within the time scale ranges encountered in most seismic work, it may be maintained constant. It is possible that longer increments could be used, with a resulting decrease in machine running time with very little degradation of the output data correlations.

It will be apparent that, as a plurality of traces is scanned in accordance with the invention, a corresponding plurality of signals is generated from the traces during each interval of reproduction. It is this plurality of signals which constitutes the material that is fed to the computing and printing components of the invention.

The first operation which is performed on the reproduced trace signals is one in which the individual signals are algebraically summed. Next, the summed signal is subjected to an analog computing system which performs an operation on the signal of a character to generate an electrical transient wherein amplitude variations in the summation signal are emphasized. The resulting transient or signal is then preferably fed to an integrator and integrated over each reproduction time interval to form a product signal whose magnitude bears a relation to the degree of correlation of information within the summed signal.

Having thus generated a signal which is, in effect, an index of the correlation of the information reproduced in any given interval of reproduction, the product signal is recorded or printed upon a photographic recording medium. The printing operation is coordinated with the reproduction operation so that the product signal is printed at a position and in an orientation on the recording medium which is consistent with the position and orientation of the corresponding interval of reproduction on the original seismic record. Thus, the lateral dimension and the "dip" of the newly recorded signal are kept proportional to the same characteristics of the corresponding reproduced interval; and the longitudinal position of the new signal along the length of the recording medium is made to correspond to the longitudinal position of the reproduced interval along the original record.

The correlated records that are obtained by the invention are photographic records that—in a sense—resemble conventional variable density records. Thus, the relative magnitude of any product signal from the computing system is represented by a photographic image of variable density on the correlated records produced by the invention.

It is also a preferred version of the present invention that seismic sections be used as the records which are correlated or analyzed by the invention. The correlated records produced by the invention then become—in effect—seismic sections wherein seismic information has been correlated to aid in their interpretation.

The invention may be better understood by reference to the attached drawing in which:

FIGURE 2 is a diagrammatic cross-section view of a preferred type of lamp house for use with the invention.

FIGURE 3 is an end view of the lamp house shown in FIGURE 2.

FIGURE 4 is a diagrammatic view in longitudinal cross section of a suitable light collection assembly for use with the invention.

FIGURE 7 is a diagrammatic longitudinal cross-section view of a preferred lamp house for the projection assembly of FIGURE 1.

Figure 1:
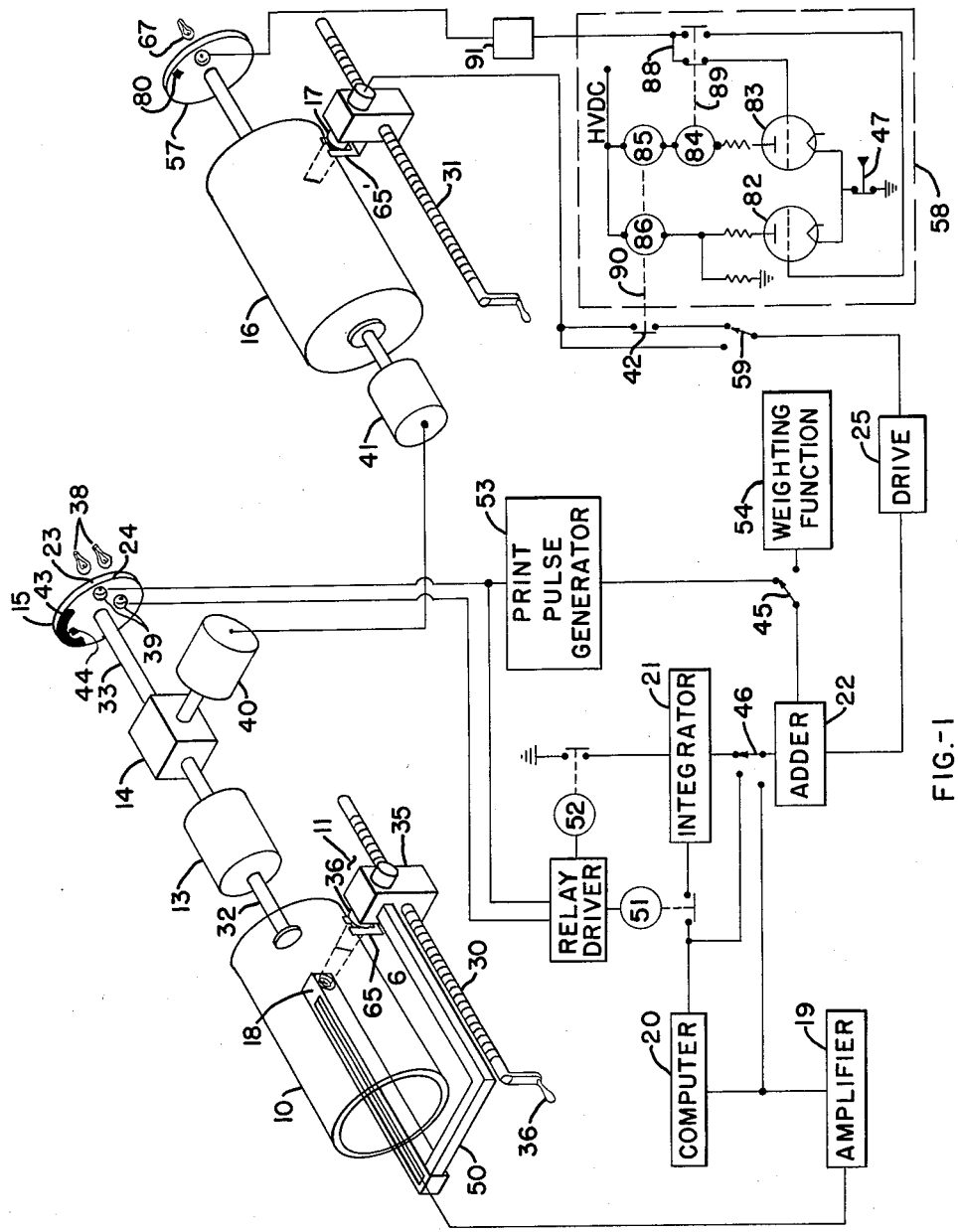
FIGURE 1 is a diagrammatic representation of a preferred embodiment of the invention.

Referring first to FIGURE 1, the major apparatus components shown in this figure include: playback drum 10, light projection assembly 11, drive means 13, gear box 14, gating wheels 15 and 57, recording drum 16, and light projection assembly 17.

Major electrical components of the apparatus in FIGURE 1 include photocell 18; amplifier 19; computer 20; integrator 21; adder 22; driver circuit 25; electronic gates 23, 24 and 67; pulse generator 53; weighting function circuit 54; and control circuit 58.

Also included in FIGURE 1 are lead screws 30 and 31; selsyn motors 40 and 41; bracket 50; relays 51, 52 and 42; and switches 45, 46 and 47.

Drive means 13 may be any conventional type of power source, but it is preferably a hysteresis-type synchronous electric motor adapted to rotate drum 10 at a substantially constant rate through shaft 32. Drive motor 13 also drives selsyn motor 40 and gating wheel 15 through gear box 14. Gear box 14 need not be a single member as shown and instead may consist of two or more gears selected to perform the functions required by the invention. Thus, functionally, gear box 14 should be of a character to drive gating wheel 50 at a slightly different speed than drum 10; and it should also be of a character to drive selsyn motor 40 at a speed such that drum 16 is at all times coordinated in its rotation with the scanning operation performed on drum 10. The nature of these particular functions will become more apparent with the following description.

Drum 10, as shown, preferably is an elongated, hollow, cylindrical member adapted to receive and support a reproducible seismic record around its cylindrical surface. Mechanical clamps or other suitable devices for mounting a seismic record on the surface may be used. Ordinary masking tape has been found to be entirely satisfactory for the intended purpose, and it is very easy to apply.

Since a particularly preferred type of seismic record for the purposes of the invention is a film negative-type variable density seismic section, drum 10 is preferably constructed of a transparent plastic material such as a methacrylate resin or the like. It is also preferably mounted upon shaft 32 by means of a lock nut, screws, or the like which permits rotational adjustment of the drum relative to the shaft.

Mounted along the side of drum 10 is lead screw 30 which threadedly engages the block portion 35 of the light projection assembly 11. Thus, rotational movement of screw 30—as by means of crank handle 36—causes the light projection assembly 11 to move along the length of the screw.

Supported within block 35 is lamp house 36, a preferred version of which is shown in FIGURE 7. Turning momentarily to the latter figure, it may be seen that this member is in essence an elongated cylinder 100 which includes a cylindrical-type lens 99, a light source 102, and a plurality of baffles spaced along the length of the cylinder. The filament of light source 102 is preferably essentially linear in shape and mounted such that its linear configuration is substantially parallel to the length of lens 99. The baffles serve to prevent back-reflections of light and thereby facilitates the focusing action of lens 99.

The position of lamp house 100 within block 35 is longitudinally adjustable so that sharp focusing of light on drum 10 is possible. The lamp house is also rotatably adjustable within the block so that the light beam angle may be changed as desired; and a gear 103 may be mounted around the cylinder 100 to enable a selsyn motor or other power source to turn the lamp house.

Laterally adjustable shutters 65, supported from block 35, are positioned between lens 99 and drum 10 so as to enable the width of the light beam from lens 99 to be varied. Accordingly, it is possible to span as many traces of the section on drum 10 as may be desired. Generally speaking, it is a particular advantage and object of the invention to span at least ten traces simultaneously, and preferably from 20 to 50 traces. In this connection, a variable density seismogram from a single seismic observation generally contains about 20 to 30 individual traces; and, conveniently, the apparatus of this invention is generally adjusted to scan a variable density section in a seismogram-by-seismogram fashion. The width of the light beam—measured in the same direction as the transverse dimension of the traces on drum 10—is usually about ¾ to 1½ inches.

Block 35—in addition to supporting lamp house 36—also preferably supports light collection assembly 18. Bracket 50 interconnects block 35 with the collection assembly, and it serves to maintain the collection assembly continuously in alignment with the light beam from the lamp housing 36. Thus, as light projection assembly 11 moves along screw 30, assembly 18 is continuously adapted to receive the light beam emitted by the lamp housing 36.

At this point, it will be recognized that light in passing from lamp house 36 to assembly 18 travels through the wall of drum 10 in addition to a section which is mounted on the drum. The light that actually impinges upon the collection assembly 18 is therefore directly affected by the character of the section mounted on the drum 10.

In order that light impinging upon the light collection assembly 18 be of use to the invention, the amounts of light transmitted by the individual traces are not kept separate. Instead, the individual beams are completely mixed and focused upon a photoelectric surface in as concentrated and mixed a manner as possible. This mixing and focusing effect is achieved by using an assembly such as that illustrated in FIGURE 4.

Turning to FIGURE 4, the light collection assembly 18 of FIGURE 1 includes a plurality of convex lenses 55 and a photoelectric transducer 56. A plurality of convex lenses—arranged as shown—has the effect of receiving and focusing a beam of light substantially as a point or spot of very reduced area. Therefore, the photoelectric transducer 56 is spaced from the plurality of lenses in a manner such that light received by the lenses from the cylindrical lens 99 of FIGURE 2 is focused to a very small point or spot on the transducer. The signals generated by the phototransducer, therefore, are in effect an algebraic summation of the individual trace signals received by the lenses 55 through a section on the drum 10. Furthermore, since the light beam transmitted through the section is very narrow (lengthwise along the section), the summation signal at any given instant is a summation of substantially instantaneous trace signals. And, since the light beam can pass through a section on the drum 10 at any one of a plurality of angles, it will be apparent that the summation may be made at a substantially infinite number of angles across the section. In other words, the individual traces may be phased timewise as desired to emphasize signals bearing a particular time delay from trace to trace.

As mentioned much earlier in this description, it is a particular feature of this invention that a plurality of reproducible traces be reproduced in an interval-by-interval fashion along their length. In other words, in any given scanning and reproduction step, a single interval along the length of the traces is reproduced. Then, with each successive scan and reproduction step, a slightly displaced interval along the traces is reproduced. This effect is attained in the apparatus of FIGURE 1 by means of the gating wheel 15 in conjunction with the gates 23 and 24 as well as gear box 14.

Considering first gear box 14, it is necessary that shaft 33—interconnecting the gear box and wheel 15—rotate at a very slightly different rate than shaft 32. The reason for this relationship will be apparent in a moment.

Turning next to wheel 15, it will be observed that two electronic gates 23 and 24—each consisting of a light source 38 and a photocell 39—be positioned along the periphery of the wheel. Then, by constructing wheel 15 of a transparent plastic or equivalent material, the photoelectric cells are continuously energized except when opaque flags 43 and 44 pass through the gates.

Opaque flags 43 and 44 may be simply sections of black tape or the like of a character to interrupt a beam of light transmitted from one of the lamps 38 to its photocell 39. Flag 43, as shown, is adapted to cause gate 23 to close the normally open relay 52; and flag 44 causes gate 24 to close the normally open relay 51. Flag 43 precedes gate 44 in its action and operates: (1) at its outset to erase any signal which may exist on integrator 21 and (2) at its trailing edge to trigger the pulse generator 53. Flay 43 need not be of any particular length, so long as integrator 21 is cleared of any signal prior to activation of relay 51, and so long as generator 53 is not activated prior to the deactivation of relay 51.

With respect to flag 44, it is the peripheral length of this flag on wheel 15 that determines the length of each interval of reproduction of a section on drum 10. As mentioned earlier, it is desirable generally to have a reproduction interval of about 25 to 250 milliseconds of seismic record time. Accordingly, the length of flag 44 should be sufficient to reproduce this interval of time along a section of other seismic record on the drum 10.

It will now be apparent why gating wheel 15 must rotate at a slightly different speed than the drum 10. The differential speed is necessary in order that the gates 23 and 24 may act at slightly different points along a record or section on drum 10 with each successive rotation of the drum. In a specific embodiment of the invention, it has been found that an effective arrangement consists in having wheel 15 rotate relative to drum 10 so as to displace the action of the electronic gates about four milliseconds of record time for each drum revolution. Obviously, somewhat different displacements may be used so long as effective correlation of information is obtained. As mentioned earlier, it is desirable that each point along a seismic record be reproduced (i.e., "sampled") at least about 10 and preferably about 20 times for each angle of scan.

Returning now to light collection assembly 18, each summation signal that is generated by this assembly is transmitted to amplifier 19, where it is amplified and in turn transmitted to computer 20. Amplifier 19 does not in itself constitute a critical component of the invention, and any conventional amplifier may be used consistent with the frequencies and signal strengths that are involved.

Amplified signals from amplifier 19 pass to computer 20, which should be of a character to emphasize amplitude variations in an electrical transient. Suitable circuits for this purpose, for example, are analog computing circuits which are of a character to generate signals bearing an exponential relationship to signals that are fed to the circuits. The exponent of amplification should be greater than none and preferably at least two. Analog circuits capable of squaring, cubing, quadrupling, etc., an incoming signal are therefore preferred for the purposes of the invention. Examples of commercially available analog circuits of this type are the model MU/DV duplex multiplier-divider units that are manufactured by George A. Philbrick Researches, Inc., Boston, Massachusetts.

Signals from the computer 20 may take several paths, but they are preferably transmitted through relay 51 to integrator 21 which may be of any conventional type adapted to integrate an electrical transient with time. A suitable unit for this purpose is the model K3-J integrating component which is also manufactured by George A. Philbrick Researches, Inc., supra.

Each signal from integrator 21 ultimately controls the amount of light emitted by assembly 17. Thus, each signal passes through switch 46 to adder circuit 22, where it combines with a pulse signal from generator 53; and each combined signal activates driver 25. Driver 25 transmits an amplified signal through switch 59 as shown to assembly 17.

Pulse generator 53 may be a one-shot multivibrator adapted to generate pulses of equal amplitude and duration for each deactivation of relay 52—i.e., each time the trailing edge of flag 43 passes through gate 23.

Adder 22 may be any suitable component for adding a signal from generator 53 to each signal from integrator 21. A linear D.C. amplifier or differential D.C. amplifier, for example, may be readily adapted to this task.

Assembly 17 is basically similar to assembly 11 in that it projects a linear beam of light against drum 16. Assembly 17 is movable along screw 31, and a preferred form of lamp house 36 for it is shown in FIGURES 2 and 3. The lamp house comprises a cylinder 60 with a cylindrical lens 61 at one end, an intermediate convex lens 62, and a glow tube 63 at the opposite end. Lens 62 directs essentially parallel light to lens 61 which focuses a linear beam on drum 16.

Lens 61 is mounted within gear 64 and it is rotatable relative to cylinder 60 by virtue of bearings 70. Cylinder 60 is longitudinally adjustable within its supporting block to facilitate focusing.

It will be apparent that assembly 17 may be positioned relative to drum 16 in a manner to correspond to assembly 11 and drum 10. Shutters 65 permit adjustment of the dimension of the light beam from assembly 17.

Having thus described the structural aspects of the in- vention, attention is now directed toward the best mode contemplated for practicing the invention. In this connection, it will be assumed that it is desired to process a variable density film-negative, seismic section consisting of a plurality of corrected seismograms—each seismogram comprising approximately 20 to 30 traces.

As a first step in the process, the section to be analyzed is placed upon drum 10; and the shaft position of drum 10 is adjusted so as to be aligned properly with the gates 23 and 24 on wheel 15. A photosensitive film is similarly placed on drum 16, and it is oriented on the drum so as to agree with the section on drum 10. Light projection assemblies 11 and 17 are positioned opposite corresponding points on the original record and the unexposed film; and the two optical systems are adjusted so as to focus similar light beams upon the two drums. In other words, the projection assemblies are positioned at similar points along screws 36 and 31; and the angles and dimensions of the two light beams are made proportional.

It will be assumed that drum 16 is geared through box 14 and driven by motors 40 and 41 so as to rotate at the same speed as drum 10. At this point, the motor 13 is started; and analysis is initiated.

As drum 10 rotates for the first time toward a reproduction interval, the leading edge of flag 43 triggers gate 23 and causes relay 52 to close. Any signal stored within the integrator is erased, and the integrator is placed in a condition to receive a signal from computer 20.

Shortly after gate 23 has been triggered by flag 43, gate 24 is next triggered by flag 44. At this instant, normally open relay 51 closes; and integrator 21 is connected directly to the computer 20. The algebraic summation signal generated by the light reception assembly 18 is transmitted through amplifier 19 and computer 20 to relay 51. This signal is continuously integrated during the period that flag 44 is passing through the gate 24. Immediately after the flag has passed the gate, relay 51 is again opened; and signals from computer 20 to integrator 21 are interrupted.

Each signal supplied to the integrator 21 during the actuation of gate 24 remains on the integrator and is impressed on the adder circuit 22 until relay 52 is again closed. It will be realized that this particular integrator value is associated with a particular gate position. Accordingly, its value should be impressed on the output film on drum 16 at a particular gate correspondence time; and it may be printed in a length equal to the gate moveover—i.e., as a definite film density whose length in the film time direction is approximately four milliseconds (the gate movement increment). In practice, successive prints are preferably slightly broader than this to prevent the appearance of striations on the output film.

The reset flag 43 is made longer than the integrating flag 44 so that its signal begins before the integrator signal and ends after it. As noted above, the reset relay 52 is operated by the front edge of flag 43; and the rear edge of this flag produces a print pulse from generator 53. It is understood that each integrated signal from integrator 21 is continuously applied to the adder 22 so biased that the adder never drives the glow tube circuits in the absence of a print pulse. Each print pulse is maintained at a constant amplitude and is applied as a second adder input. When the two signals are summed by the adder, the resultant signal drives the glow tube during the duration of the print pulse. Since the print pulse amplitude is constant, the line or bar printer on drum 16 has a density which is determined by the value of the integrator signal alone. Accordingly, whenever a good degree of correlation exists in the information on drum 10, a strong line image or bar will be recorded on drum 16. Conversely, if the correlated signal is weak, little or no record will be formed on drum 16.

During each successive rotation of drum 10, the procedure just described reoccurs, until the entire length of a seismic record has been scanned. Successive printing of the resulting lines or bars on the film on drum 16 thereby generates a computed film strip on the latter drum for each set of traces scanned on drum 10.

Figure 5:
FIGURE 5 is a photocopy of a complex corrected variable density multitrace record of a type which is readily processed by the invention.
Figure 6:
FIGURE 6 is a photocopy of a correlated record derived in accordance with the invention from the record shown in FIGURE 5.

After a set of traces on drum 10 has been scanned in the manner just described for a given angle of the light beams from assemblies 11 and 17, the angle of the beams may be changed to a new value and the procedure repeated for the same set of traces. Alternatively, the same light beam angle may be retained; and the projection assemblies 11 and 17 may be stepped along their respective screws 30 and 31 to scan a new set of traces. Ultimately, however, the entire seismic record on drum 10 is throughly scanned with different light beam angles. The record eventually formed on drum 16 is therefore, in effect, a composite photograph showing which light beam angles provide the best probable degrees of correlation of events contained in the record on drum 10. An example of the results that are attainable with the invention is shown in FIGURE 6. The record in this figure is a correlated version of the corrected seismogram in FIGURE 5.

At this point, it will be recognized that numerous variations in the apparatus shown and discussed thus far may be used without departing from the spirit or scope of the invention.

For example, it is possible to drive drum 16 at a very slow speed relative to drum 10—in particular, at the same rate at which the interval stepping occurs along drum 10. In other words, if it is decided beforehand to step the interval of interest on a record on drum 10 four milliseconds for every rotation of the drum, it will be apparent that drum 16 may be rotated at this very same rate—i.e., about four milliseconds of record time for every rotation of drum 10. In this event, of course, motor 40 must be geared through box 14 to motor 13 at a very substantial reduction ratio. Furthermore, the gear box 14 in this instance is preferably a variable speed member so that rotation of drum 16 may be adjusted to correspond to the gate scan speed of drum 10. The glow tube 63 continuously emits light of an intensity proportional to output of integrator 21; and the pulse generator 53 and adder 22 may be eliminated, since discreet pulses are not now printed on the recording drum. An integrating condenser, not shown, may be used to store the output of the integrator and supply the same to the driver 25.

Additional selsyn motors may be used to coordinate the action of lead screws 30 and 31. Then, any movement of assembly 11 is accompanied directly by a similar movement of assembly 17.

Other selsyn motor combinations may be used to cause the cylindrical lens of assembly 17 to follow motions of the cylindrical lens of assembly 11. As noted in FIGURE 2 of the drawing, lens 65 is preferably mounted in a gear 64; and similar gear assemblies on each projection assembly may be interconnected by selsyns.

In some instances, it may be desirable to include means for blanking signal transmission to amplifier 19 from assembly 18 during each rotation of drum 10 when end portions of a record on this drum pass through the light beam from assembly 11. The end portions conventionally are more transparent than the signal record portion and cause very large electrical signals to be transmitted to the amplifier. Since these signals tend to upset the amplifier, blanking of the signals is preferred at this point. A relay actuated by a contact from shaft 32 every revolution of the shaft will readily serve this purpose.

It is also possible with the present invention to make photographic correlated prints of computed signals or wave forms other than those just described. For example, signals may be taken from either the amplifier 19 or the computer 20 through the switch 46 directly to the adder 22 without passing through the integrator 21.

When the integrator is not included in the operation of the invention and a signal is taken directly from the amplifier 19 or the computer 20 to the adder, the print pulse generator 53 is deactivated; and a weighting function 54 is instead supplied to the adder through switch 45. In its simplest form, the weighting function merely biases the signal from the adder to the driver 25 as may be desired. The weighting function makes it possible to print strips on the drum 16 in which the background signal is black and the incoming signals produce white streaks; or, alternatively, where the background signal is white and the incoming signal prints toward the black. More normally, however, the bias is adjusted to give the film on the drum 16 a neutral density background; and the density of the film is driven both black and white with respect to this background, depending upon the magnitude of the signal from the driver 25. In short, the adder circuit 22 in conjunction with the weighting function 54 makes it possible to use any desired type of background or threshold so as to enhance the appearance of the exposed output film.

When printing signals directly from the amplifier 19 or the computer 20, it is also of interest to note that the drum 16 is preferably driven at the same speed as drum 10; and a complete correlation strip is printed around the drum during each rotation of the drum. In this type of operation, the gate stepping technique is not used; and, instead, a complete strip or correlation trace is formed on drum 16 for each rotation of this drum. In other words, for each rotation of drum 16, a complete trace—rather than a single interval—is printed on the drum showing the degrees of correlation for a given light beam angle along a given set of traces on drum 10. The angle of the light beam may be changed for each successive rotation of the drum, and a new photographic correlation trace may be overlaid or superimposed upon the already existing trace. This procedure is repeated until the desired number of light beam angles has been investigated.

When printing continuous strips of information rather than discrete intervals on drum 16, it is preferred to use a separate control system 58 for effecting the printing operation. The operation of the control system 58 is coordinated with gating wheel 57, electronic gate 67, and polarized relay 42 for this purpose.

Gating wheel 57—like wheel 15—may be a transparent plastic disc which is mounted in a rotationally adjustable manner on the shaft of the print drum 16. Flag 80 on wheel 57 is placed so as to pass between the photocell and light source components of the electronic gate 67 when the end portions of a film on the drum 16 pass in front of the light projection assembly 17. When flag 80 passes through the electronic gate 67, driver 91 is triggered to activate the control circuit 58; and the latter circuit in turn activates polarized relay 42 so that light projection assembly 17 receives and projects signals to drum 16 during the scan of a set of traces on drum 10.

Control circuit 58 may consists of any suitable arrangement for the purpose. A particularly effective arrangement is the one schematically shown in FIGURE 1. The apparatus in that instance consists of two thyratrons 82 and 83, switch 88, and hand-operated switch 47. Coil 84 in the plate circuit of thyratron 83 serves to throw switch 88 to its opposite contact position. Coil 85 in the plate circuit of the same thyratron and coil 86 in the plate circuit of thyratron 82 close and open relay 42, respectively.

Operation of the control circuit 58 and its associated equipment is carried out in the following manner when printing continuous strips on information drum 16. First, switch 59 is thrown to the contact position presently shown to be open; and switch 47 is opened and then closed at some point before flag 80 passes through gate 67. Opening of switch 47 extinguishes the thyratrons 82 and 83, and subsequent closure of the switch places them in readiness for a printing operation.

As flag 80 passes through gate 67, a signal is triggered from driver 91 and fires thyratron 83. Coil 84 thereby causes switch 88 to move to its presently open contact position by means of linkage 89; and coil 85 similarly causes polarized relay 42 to close by means of linkage 90. Signals may now pass from driver 25 through switch 59 and relay 42 to assembly 17.

When gating wheel 57 has completed its revolution, flag 80 again passes through gate 67, with the result that a signal is now transmitted from driver 91 to the grid of thyratron 82. Firing of this thyratron causes coil 86 to open relay 42, and signals from the driver 25 to the assembly 17 are interrupted. It will be apparent that switch 47 must again be opened and closed before the entire operation can be repeated.

No light-tight closure has been shown for drum 16, but it will be apparent that such an enclosure will be desirable if the equipment is operated in a lighted area. Alternatively, this portion of the equipment may be operated in a darkened room, thus obviating the necessity of using a special enclosure member.

It will also be recognized that power sources, relays, switches, and the like may be used as desired to further implement or modify the equipment discussed in this description. Such components are conventional in the art, and it has not been considered necessary to consider them at great length in this description.

The invention claimed is:

1. An apparatus for the analysis of a multi-trace reproducible seismogram including a first rotatable drum adapted to support a seismic record around its cylindrical surface, scanning and signal generating means adjacent said drum and adapted to scan a plurality of said traces simultaneously, a second rotatable drum adapted to receive a photographic film around its outer cylindrical surface, means to project a line-shaped beam of light against the surface of said second drum, means to adjust the angular disposition of the scanning and signal generating means relative to the length of the seismic record so as to scan said plurality of traces in a predetermined time-delay relation, means cooperating with said light projection means to direct said beam of light against said second rotatable drum at the same angular disposition as said scanning and signal generating means, means to sum algebraically the individual trace signals scanned by said scanning and signal generating means, analog means to generate a signal of a character to emphasize amplitude variations in the summed signal, means to integrate an electrical signal with time, gating means operative upon each rotation of said first rotatable drum to transmit a signal from said analog means to said integrating means during a predetermined interval of rotation of said first rotatable drum, means cooperative with said gating means to displace said interval a predetermined arcual distance along said seismic record for each successive rotation thereof, means to vary the intensity of said light projection means in response to the magnitude of each integrated signal, means to effect an arcual displacement between said second rotatable drum and said light projection means which corresponds to the arcual displacement of said scanning and signal generating means relative to said rotatable drum.

2. An apparatus for the analysis of a multi-trace reproducible seismic record which comprises in combination a first rotatable drum adapted to support the seismic record around its cylindrical surface, a second rotatable drum adapted to support a photographic recording medium, scanning and signal generating means adjacent said first rotatable drum adapted to scan a plurality of said traces simultaneously for each rotation of the drum, said scanning and signal generating means being angularly adjustable relative to the record to scan preferentially reflections within the record which lie at a predetermined angle of dip, means to sum algebraically the instantaneous individual trace signals scanned and generated from said plurality of traces, analog means to generate a transient of a character to emphasize amplitude variations in each summed signal, integrating means to integrate each transient received from the analog means, gating means to transmit a transient from said analog means to said integrating means during a predetermined interval of each rotation of said first drum, means to actuate the gating means at a different rotational position during each successive rotation of said first drum, recording means adjacent said second drum to record in variable density form the integrated value of each transient transmitted to the integrating means, means to record the variable density signal at a position along the recording medium corresponding to the position of the interval from which it is derived along the seismic record, said recording means being angularly adjustable to record the integrated transient at an angle relative to the length of the recording medium corresponding to the predetermined dip angle, and means to adjust the lateral dimension of the recorded signal to correspond to the lateral dimension of the plurality of traces.

3. An apparatus for the analysis of a multi-trace reproducible seismic record which comprises in combination a first rotatable drum adapted to receive said record, a second rotatable drum adapted to receive a photographic recording medium, playback means adjacent said first drum and adapted to scan simultaneously a plurality of said traces upon rotation of the drum, means to sum algebraically the instantaneous trace signals scanned and generated by the playback means, analog computer means responsive to the summation signal to generate a second signal of a character to emphasize amplitude variations in the summed signal, light projection means adjacent said second drum of a character to direct a line-shaped beam of light against said recording medium variable in intensity in response to a variable amplitude electrical signal, electrical circuit means interconnecting said computer means and said light projection means, means to synchronize rotation of said drums so as to record computed signals along the length of said recording medium at positions corresponding to the positions of the trace information along the seismic record from which the computed signals are derived, said playback means being adjustable so as to scan said plurality of traces in a predetermined time-phase relation and means to adjust the angular position of said light beam from said projection means relative to said recording medium.

4. In a method for analyzing a multi-trace reproducible seismic record, the improvement which comprises simultaneously scanning along and playing back a plurality of said traces to produce a corresponding plurality of trace signals while maintaining a predetermined time-phase relation between the traces, algebraically summing the instantaneous values of the individual trace signals, analogically computing and generating an electrical signal of a character to emphasize amplitude variations in the summed signal, recording the electrical signal in variable density form along the photographic recording medium, and inclining the recorded signal at an angle relative to the recording medium corresponding to the time-phase relation employed in the playback step.

5. An apparatus for the analysis of a multi-trace reproducible seismic record which comprises in combination a first rotatable drum adapted to receive the record around its cylindrical surface, playback means adjacent said first drum adapted to simultaneously scan and generate instantaneous signal values from the plurality of traces in the form of electrical signals, means to adjust the angular position of the playback means relative to the plurality of traces so as to scan instantaneous signal values lying at a predetermined angle of dip within the traces, a second rotatable drum adapted to receive a photographic recording medium around its cylindrical surface, light projection means adjacent said second drum and adapted to direct a line-shaped beam of light against the recording medium, means to adjust the angle of the beam relative to the length of the recording medium to correspond to said angle of dip, means to adjust the dimension of said beam extending in the direction of movement of said second rotatable drum, means to sum continuously and algebraically the instantaneous electrical signals scanned and generated by the playback means for a predetermined distance along the plurality of traces, and means to transmit the summed signal continuously to the light projection means.

6. An apparatus for the analysis of a multi-trace reproducible-type seismic record which comprises: scanning and signal generating means to repeatedly scan along the length of a plurality of the traces on said record, said scanning and signal generating means being adjustable relative to said record so as to scan said traces in different preselected time-phase relations, a photographic-type recording medium, light-projection means of a character to direct a line-shaped beam of light against said recording medium and to form a trace recording thereon upon relative movement therebetween, means to synchronize the relative movement between said scanning and signal generating means and said record with the relative movement between said projection means and said recording medium, means to adjust the angle of said light beam relative to said recording medium, means to algebraically sum the output from said scanning and signal generating means, and means responsive to said algebraically summed output to vary the intensity of the light beam from said projection means.

7. An apparatus for the analysis of a multi-trace reproducible-type seismic record which comprises: scanning and signal generating means to repeatedly scan along the length of a plurality of the traces on said record, said scanning and signal generating means being adjustable relative to said record so as to scan said traces in different preselected time-phase relations, a photographic-type recording medium, light-projection means of a character to direct a line-shaped beam of light against said recording medium and to form a trace recording thereon upon relative movement therebetween, means to synchronize the relative movement between said scanning and signal generating means and said record with the relative movement between said projection means and said recording medium, means to adjust the angle of said light beam relative to said recording medium, means to algebraically sum the output signals from said scanning and signal generating means, analog means to generate an electrical signal of a character to emphasize amplitude variations in the summed signal, means to integrate an electrical signal with time, gating means operative upon each scan of said scanning and signal generating means to transmit a signal from said analog means to said integrating means during a preselected interval of each said scan, means cooperative with said gating means to displace said interval a preselected distance along said record for each successive scan, means to vary the intensity of said light-projection means in response to the magnitude of each integrated signal; and means to synchronize the movement between said projection means and said recording medium with the movement between said scanning and signal generating means and said record, and means to adjust the angle of said light beam relative to said recording medium.

8. An apparatus for the analysis of a reproducible multi-trace seismic record which comprises in combination a first rotatable drum adapted to receive the record around its cylindrical surface, a second rotatable drum adapted to receive a photographic recording medium around its cylindrical surface, scanning and signal generating means adjacent said first drum and adapted to scan simultaneously a plurality of said traces upon rotation of said drum, said scanning and signal generating means being angularly adjustable relative to said record, light projection means adjacent said second rotatable drum of a character to project a line shaped beam of light on the recording medium, means cooperative with said light projection means to vary the dimension of said beam of light extending in a direction transverse to the direction of rotation of said second rotatable drum a distance proportional to the width of said plurality of traces on said reproducible record, gating means cooperative with said scanning and signal generating means to scan a predetermined interval along said plurality of traces upon each rotation of said first rotatable drum, means to effect predetermined arcual displacement of said interval along the seismic record for each successive rotation of said first rotatable drum, means to sum algebraically the individual trace signals scanned and generated during each interval, analog means to emphasize amplitude variations in the summed signal, means to integrate the signal generated by the analog means over the period of each scanning interval, means interconnecting said light projection means and said integrating means to vary the intensity of said light beam in response to the magnitude for the integrated signal, and means to record the light beam at a position along said recording medium corresponding to the position of said interval along said record.

9. In a method for analyzing a multi-trace reproducible seismic record, the improvement which comprises repeatedly scanning along a plurality of traces at a preselected scan angle so as to maintain a preselected time-phase relation between the traces and to generate the signals recorded on the traces, algebraically summing the signals generated by the scanning of said plurality of traces, analogically computing and generating an electrical signal of a character to emphasize amplitude variations in the summed signal, recording the electrical signal as a variable-density trace along a photographic recording medium with a printing angle corresponding to said scanning angle, and synchronizing the scanning movement along said traces with the printing of the variable-density trace along the recording medium.

10. A method as defined in claim 9 in which a preselected interval of the plurality of traces on the record is scanned during each successive scan of the traces, the intervals scanned upon successive scans being displaced along the traces in an overlapping relation.

References Cited in the file of this patent
UNITED STATES PATENTS

| | | |
|---|---|---|
| 2,250,730 | Stewart et al. | July 29, 1941 |
| 2,628,689 | Rieber | May 28, 1949 |
| 2,779,428 | Silverman | Jan. 29, 1957 |
| 2,794,965 | Yost | June 4, 1957 |
| 2,800,639 | Lee | July 23, 1957 |
| 2,829,149 | Piety | June 17, 1958 |
| 2,876,428 | Skelton et al. | Mar. 3, 1959 |
| 2,888,089 | Piety | May 26, 1959 |